United States Patent [19]

Anttila

[11] Patent Number: 5,448,248
[45] Date of Patent: Sep. 5, 1995

[54] ADAPTIVE RADIO DIRECTION FINDING SYSTEM

[75] Inventor: Donald S. Anttila, Southbury, Conn.

[73] Assignee: United Technologies Corporation, Hartford, Conn.

[21] Appl. No.: 156,124

[22] Filed: Nov. 22, 1993

[51] Int. Cl.$^6$ ............................................. G01S 1/44
[52] U.S. Cl. .................................. 342/400; 342/449
[58] Field of Search ................................. 342/400, 449

[56] References Cited

U.S. PATENT DOCUMENTS

| | | | |
|---|---|---|---|
| 4,107,692 | 8/1978 | Hutcheon et al. | 343/120 |
| 4,229,740 | 10/1980 | Krilanovich | 343/113 |
| 4,263,597 | 4/1981 | Bentley et al. | 343/121 |
| 4,303,922 | 12/1981 | Hoisington . | |
| 4,317,120 | 2/1982 | Bentley et al. | 343/120 |
| 4,423,420 | 12/1983 | Krajewski | 342/400 |
| 4,814,779 | 3/1989 | Levine | 343/754 |
| 5,016,019 | 5/1991 | Hawkes | 342/400 |
| 5,053,784 | 10/1991 | Hippelainen | 342/434 |

*Primary Examiner*—Theodore M. Blum
*Attorney, Agent, or Firm*—Michael Grillo

[57] ABSTRACT

RF energy received by an antenna (10) of a radio direction finding system is evaluated for determining the presence of a RF signal transmission source at bearing values at which the received RF energy is statistically strong (33) and which have a relatively stable signal strength (35). The scanning pattern (sequence) (12, 15) of the antennae is altered to increase the dwell time of the antennae at bearings having a statistically strong and relatively stable signal strength combination, and decrease the percentage of time spent scanning the remainder of the 360 degree search spectrum. External sensors (30) are used to sense changes in antennae orientation with respect to a fixed reference to thereby reduce bearing errors (27) during changes in the attitude and heading of the platform carrying the radio direction finding system.

31 Claims, 4 Drawing Sheets

ADAPTIVE RADIO DIRECTION FINDING SYSTEM

TECHNICAL FIELD

The present invention relates to radio direction finding, and more particularly to adaptive control of the scanning rate of an antenna used by a radio direction finding system.

BACKGROUND OF THE INVENTION

In civilian as well as in Military roles, it is often necessary to use an automatic radio direction finder (ADF) to determine the relative angle (relative bearing) with respect to the platform carrying the ADF to a source of radio frequency (RF) signal transmissions. For example, a tank, ship or aircraft can use an ADF to locate the source of enemy or friendly transmissions. The information provided by the ADF can thereafter be used for tracking and homing to the source of the signals. If accurate bearing information can be measured, the location of the source of RF signal transmissions can be estimated by making several bearing cuts or estimates of the source. A typical civilian and military usage is the determination of the relative bearing of a ship or aircraft to a remote radio transmitter. This may be used for example, to allow an aircraft to fly directly over the remote radio transmitter for navigational purposes.

Direction finders are typically provided with either a mechanically rotating antennae or an electronically scanned antennae. In the case of a mechanically rotating antennae, the receiving element is continuously rotated at a constant angular speed through 360 degrees. A directionally sensitive cardioid pattern is produced by the antennae such that when the antennae is facing broad side to an emitter, a distinctive "null" or point of minimum sensitivity is detected. The measurement of angular bearing to the emitter is then developed by the antenna's electronic circuitry.

Such mechanical systems require relatively large amounts of power, and have all the mechanical problems associated with physically rotating an antennae. Systems which derive bearing information by use of the null provide accurate bearing information when adequate signal strength is available and when the installed antenna has a normal ground plane with no reflections and no discontinuities. However, the primary disadvantage of the null type ADF used with a rotating antennae is that the signal frequently fades in and out and the antenna responds to variable signal reflections, thereby significantly reducing the usefulness of the intelligence. Another problem with conventional automatic direction finding systems which utilize the null of the antennae pattern is that under weak signal conditions, the signal strength of the received signals frequently approaches the sensitivity threshold of receiver, thereby broadening the width of the null and limiting the system accuracy. Furthermore, the time required to obtain a bearing is on the order of several seconds, creating a particular problem with uncooperative transmitters because the signal may not be present long enough to develop accurate bearing information.

To overcome some of the problems associated with mechanically rotating antennas, electronically scanned antennas have been developed. One such type of electronically scanned antennae is a multi-beam array antennae which includes an array of antennae elements, coupled to an electrical lens through constrained electrical paths. During operation with an ADF system, the typical principle of operation of an electronically scanned antennae differs from the rotating antennae in that the electronically scanned antennae seeks or senses a point of maximum received RF energy instead of the minimum or null seeking approach. In a typical electronically scanned antennae there are as many as eight separate antennae sections or sectors, each covering an azimuth value of 360/8 degrees. Electronic timing and logic rapidly selects each segment in a fixed sequence to achieve a step by step sweep of 360 degrees. An example of an ADF system having an electronically scanned antenna is the DF-301F UHF/VHF radio direction finder manufactured by Rockwell-Collins. This system is capable of operating in the frequency range of 100 to 400 MHz. Timing and logic circuitry is used to provide a desired antenna rotation frequency of 5.68 kHz. This sweep or rotation process occurs continuously in both a clock-wise and counter clock-wise rotation. When a sector or sectors of the scanned antennae detect maximum RF energy, electronic circuitry converts the received RF data into a relative bearing value.

Electronically controlled direction finders of the type described hereinabove perform accurately in theory, but often perform erratically and even inaccurately when installed on a vehicle such as an aircraft or ship. Noise and/or jitter are frequently observed, and angular errors as large as ±120 degrees are seen at various RF wavelengths. This erratic performance is extensively due to appendages and projections on a typical aircraft or ship that can attenuate, redirect and/or reflect RF energy. While the true RF signal is relatively constant, the attenuated or reflected signal is typically erratic or time variant. ADF systems typically scan 360 degrees at all times, and therefore receive and process the true RF direct path signal as well as the reflected or redirected components. The combinational processing of these signals produces noise, jitter, and other errors in determining the relative bearing of the transmitter to the ADF.

SUMMARY OF INVENTION

Objects of the invention include provision of a radio direction finding system having improved bearing accuracy and reduced noise and data jitter associated with reflected and redirected signals.

According to the present invention, RF energy received by an antenna of a radio direction finding system is evaluated for determining the presence of a RF signal transmission source at bearing values at which the received RF energy is statistically strong and which have a relatively stable signal strength.

In further accord with the present invention, the scanning pattern (sequence) of the antennae is altered to increase the dwell time of the antennae at bearings having a statistically strong and relatively stable signal strength combination, and decrease the percentage of time spent scanning the remainder of the 360 degree search spectrum.

According still further to the present invention, external sensors are used to sense changes in antennae orientation with respect to a fixed reference to thereby reduce bearing errors during changes in the attitude and heading of the platform carrying the radio direction finding system.

The radio direction finding system of the present invention greatly improves bearing accuracy while at the same time reducing noise and data jitter associated with reflected and redirected signals. The system analyzes received RF energy and determines where the received signals are statistically strongest and where the signal strength is stable. The dwell time of the antennae is increased at bearings having a strong and stable signal strength combination. In this manner, reflected and redirected signals are ignored because although they may have a strong signal strength, they generally do not have a stable signal strength. Only true emitters will exhibit a stable signal strength over a period of time. The system of the invention also provides for the use of external sensors to sense changes in the antennae orientation. Therefore, sensed bearing errors caused by changes in antennae position caused by changes in the attitude and heading of the vehicle carrying the antenna will be reduced. These may occur during an aircraft maneuver, pitch and roll of a ship, and similar pitch and roll of a ground vehicle when traveling over rough terrain.

The system of the present invention may be used with either a mechanically rotating antennae or an electronically scanned antennae. In the case of a mechanically rotating antenna, the system may be used to adjust the rotation of the antenna to increase the time spent receiving transmissions from an identified source. Similarly, in an electronically scanned antenna, the system provides for increased dwell time of the sectors corresponding to the relative bearings of identified transmissions.

The foregoing and other objects, features and advantages of the present invention will become more apparent in light of the following detailed description of exemplary embodiments thereof, as illustrated in the accompanying drawings.

Best Mode for Carrying out the Invention

The radio direction finding system of the present invention is particularly well suited for providing improved bearing accuracy while at the same time reducing noise and data jitter associated with reflected and redirected signals. The system will be described hereinafter with respect to an antenna mounted on an aircraft; however, the system of the present invention may be used with any vehicle mounted or fixed radio direction finding system. Additionally, the system is described as providing adaptive control of an electronically scanned antenna; however, the adaptive control of the present invention is equally applicable to mechanically rotating antenna, as described in greater detail hereinafter.

Figure 1:
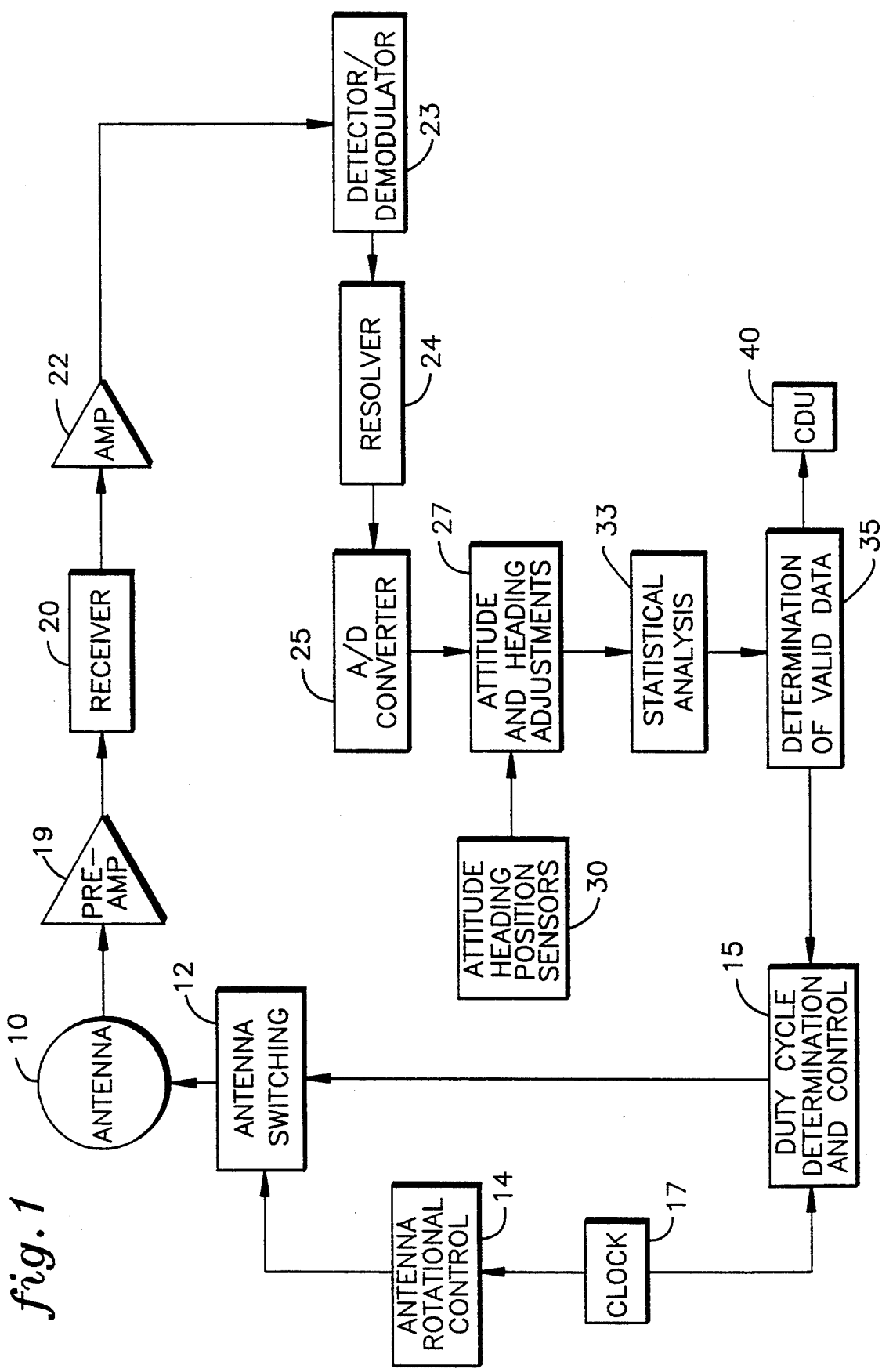
FIG. 1 is a schematic block diagram of a radio direction finding system of the present invention.
Figure 2:
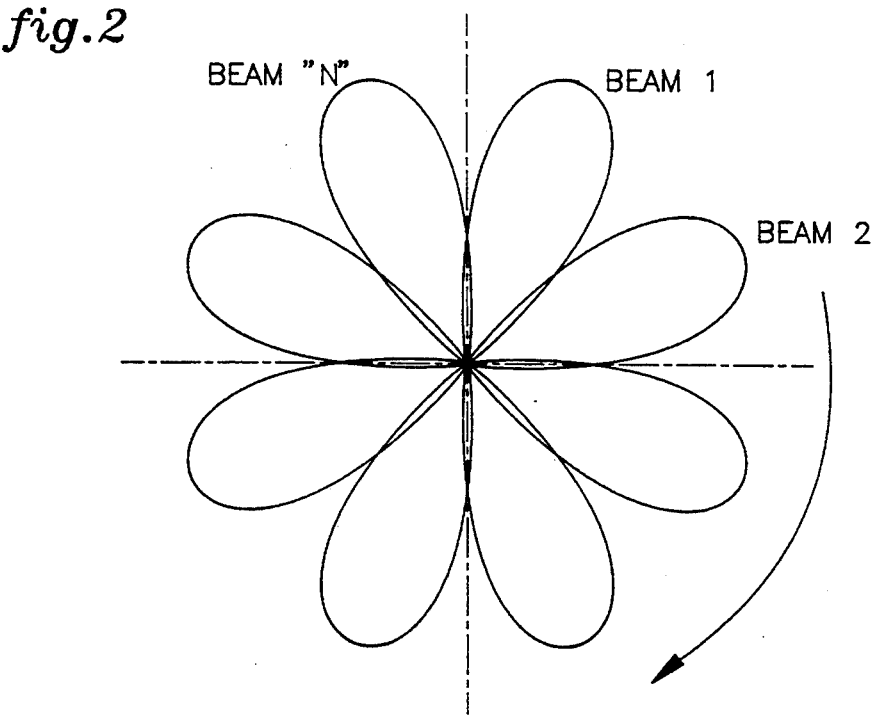
FIG. 2 is a graph showing the beam pattern of an electronically scanned ADF antenna.

Referring to FIG. 1, RF signals, e.g., UHF and VHF radio signals, are received by an electronically scanned antenna 10, e.g., a multi-beam array antenna. The electronically scanned antenna is provided with "n" separate antenna sections or sectors, each covering an azimuth value of 360/n degrees. Electronic logic rapidly selects each segment in an orderly sequence to achieve a step by step sweep of 360°. Referring to FIG. 2, the sector pattern of a typical antenna 10 is illustrated. In the example of FIG. 2 there are eight separate antenna sectors, each sector covering approximately 45°.

Figure 3:
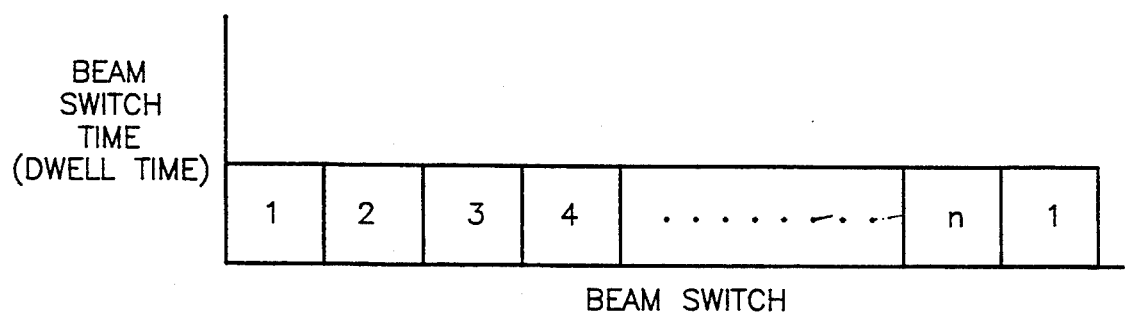
FIG. 3 is a graph showing beam switching utilized by the radio direction finding system of FIG. 1 during operation in a standard duty cycle.

The switching between antenna sectors is controlled by an antenna switching function 12 in response to signals provided by an antenna rotational control 14 and an antenna duty cycle function 15. Both the antenna rotational control 14 and the antenna duty cycle function 15 are provided with a synchronization signal, e.g., a 5.68 kHz clock signal, by a clock 17. The antenna rotational control 14 controls the direction of rotation of the antenna, e.g., which sector will be selected next in a 360° sweep. The antenna duty cycle function 15 determines the time that each sector is activated in the search pattern. In FIG. 3, the normal duty cycle of the antenna is illustrated. For an electronically scanned antenna which has eight sectors rotating at a rate of 5.68 kHz, the dwell time of each sector prior to switching to the next sector is approximately 0.22 milliseconds. During operation in the standard duty cycle, the dwell time of each of the sectors is identical. As will be described in greater detail hereinafter, once a valid source of RF transmissions (a target) has been identified, the dwell time of the sectors having a relative bearing corresponding to the target location are increased to further improve the accuracy of determining the target location, and to reduce the effects of noise and jitter caused by reflection and redirection of the target signal.

Referring again to FIG. 1, the received RF signal is amplitude modulated at the beam switching frequency. As is known in the art, rotation of the antenna translates the spatial angle of the incoming RF signal to a phase difference between the antenna modulated output and a reference signal synchronized with the antenna rotation. From this phase difference the bearing of the incoming signal can be recovered.

The antenna output is fed directly to a pre-amplifier 19. The pre-amplifier 19 terminates the antenna in a suitable impedance to maintain the desired system vswr. The RF output of the pre-amplifier 19 is provided to a receiver 20 for audio detection. The audio signal provided by the receiver 20 is amplified by an audio amplifier 22 and thereafter provided to a detector/demodulator 23. The detector/demodulator 23 may be of any suitable type known in the art for determining the bearing information based on the receiver audio output. For example, either an analog filter/detector or a synchronized filter/detector may be used for receiving the transformer coupled audio output from the receiver. The filter/detector circuitry thereafter resolves the bearing information into its quadrature components or other suitable format which may be used by a resolver 24 or like equipment for providing a signal indicative of the relative bearing to the target. The output of the resolver 24 is an analog signal containing information indicative of target magnitude, e.g., signal strength, and bearing, and is provided to an analog-to-digital converter 25 which converts the analog signal into a digital signal.

The ADF equipment described thus far, with the exception of the duty cycle control function 15, is exemplary of that which is known in the art. It will be understood by those skilled in the art that various ADF configurations may be used with the present invention. The present invention utilizes signal magnitude and bearing information to discriminate between valid RF transmissions and reflected and redirected RF signals.

The digital bearing information from the analog-to-digital converter 25 is provided to an attitude adjustment function 27. The other inputs to the attitude adjustment function 27 are attitude and heading signals provided by attitude and heading sensors 30. The attitude and heading sensors provide signals indicative of changes in aircraft attitude and heading with respect to an earth reference and therefore, provide attitude and heading signals indicative of the movement of the antenna with respect to an earth reference. As is known in the art, changes in antenna position cause changes in indicated target bearings. Therefore, the attitude adjustment function 27 utilizes the attitude and heading signals to adjust the bearing information to correct for errors caused by changes in the antenna orientation.

Next, the corrected digital signals are provided to a statistical analysis function 33. As will be described in greater detail hereinafter with respect to FIG. 4, the statistical analysis function is responsive to the digital signals provided by the attitude adjustment function 27 for determining if the digital signals are indicative of RF signals from a valid source of RF transmissions or a reflected or redirected signal or other noise. Therefore, the statistical analysis function 33 determines those digital signals which correspond to actual RF transmissions. The output of the statistical analysis function 33 is provided to a validation function 35 which processes the statistical analysis information along with information related to the signal strength of the received RF signals to determine valid data signals. As will be described in greater detail hereinafter with respect to FIG. 4, a signal is determined to be valid if it is determined to be a statistically valid signal by the statistical analysis function 33 and also if the signal strength is sufficiently strong to be classified as a signal by the validation function 35. The valid data is provided to a control display unit 40 (CDU) or other display device to provide the system operator a visual indication of the valid emitter information. Additionally, the valid data information is provided to the duty cycle function 15 which controls the antenna switching function 12. As will be described in greater detail with respect to FIG. 4, when there is no data indicative of a valid target provided by the validation function 35, the duty cycle function maintains the standard or normal duty cycle. However, when a valid target is identified, the duty cycle function increases the dwell time of the antenna sectors the relative bearing of which correspond to the valid target.

Figure 4:
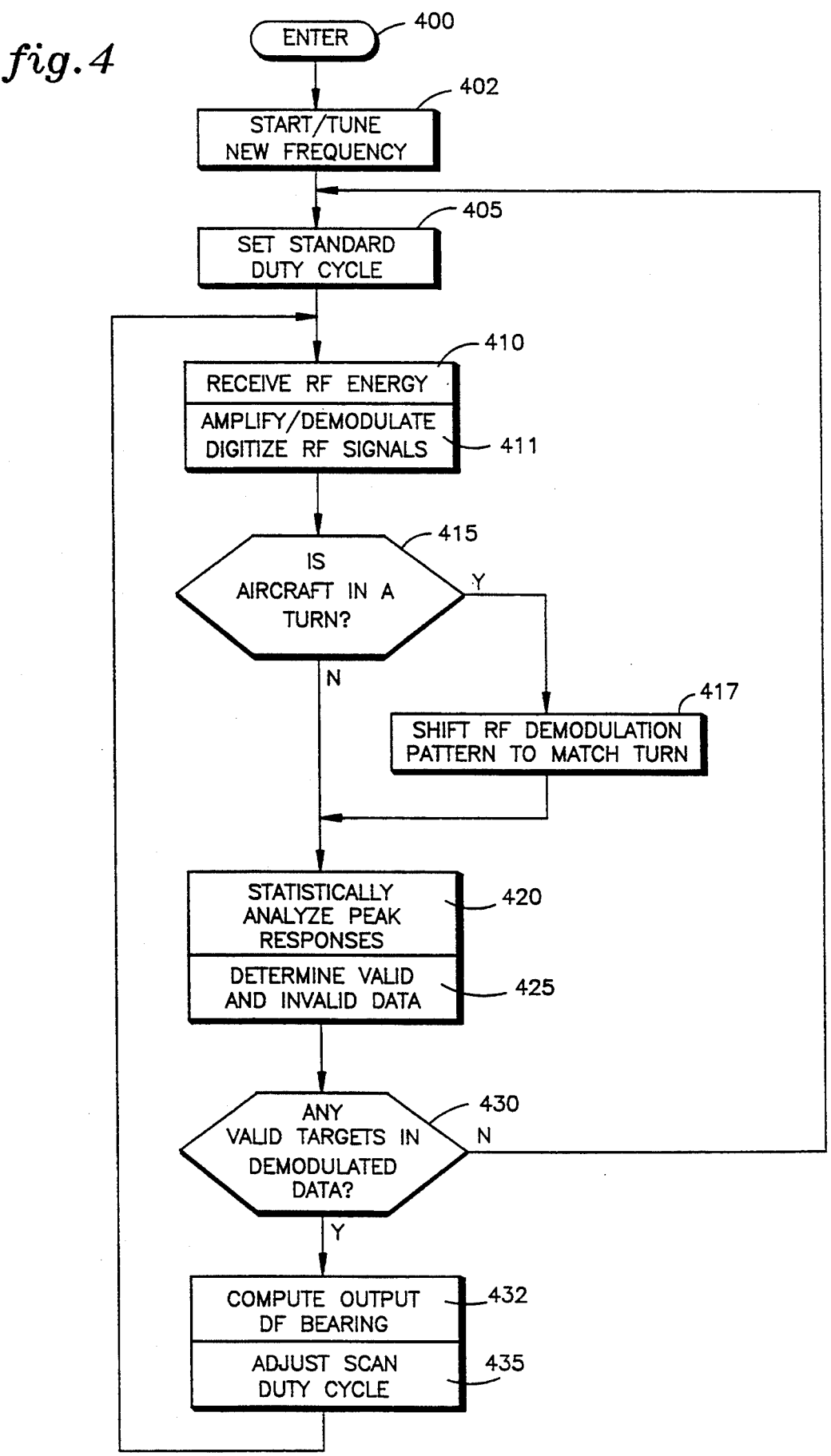
FIG. 4 is a logic flow diagram utilized by the radio direction finding system of FIG. 1 for adaptive control of antenna rotation (dwell time) in accordance with the present invention.

The system of FIG. 1 may be implemented using the subroutine of FIG. 4. The subroutine is entered in a step 400, and thereafter a step 402 is performed wherein the antenna is set to receive a range of frequencies or a specific frequency. Next, a step 405 is performed wherein the standard duty cycle is set for the antenna rotation.

Steps 410 and 411 are then consecutively performed wherein RF energy is received, amplified, demodulated and digitized. The digital signals are indicative of the relative bearing and magnitude of the received RF signals. Then, in a test 415, aircraft attitude and heading are analyzed to determine if a change has occurred. If the results of the test 415 are negative, then no modification of the digital data is required. However, if the results of the test 415 are positive, the relative position of the antenna with respect to the ground has changed, and a step 417 is performed wherein the RF digital data is shifted to match the change in antenna orientation with respect to the earth reference.

Step 420 is then performed wherein a statistical analysis of the digital data is performed. During the statistical analysis, the relative bearings of all of the digital signals having a magnitude greater than a threshold magnitude is analyzed to determine if target information corresponding to each relative bearing has been obtained during previous antenna sweeps. For example, if an RF signal of sufficient magnitude is received at a relative bearing of 45°, the system determines if a signal has been received at a 45° relative position over the past several sweeps of the antenna. To account for relative movement of the transmitter and the aircraft, the system may check to see if a signal has been received within a certain number degrees of the current received bearing, e.g., ±5°. In this case, if the received bearing is 45°, the system checks if there has been a received signal between 40° and 50° relative over the past sweeps. To provide further accuracy in receiving actual targets, the system may be designed to identify a target provided that the target was present a minimum number of times over a threshold number of sweeps, e.g., 7 out of 10 sweeps.

As will be apparent to those skilled in the art, there are numerous statistical analysis techniques which may be utilized to determine if a valid signal is present. The statistical analysis described herein above is only exemplary of the type of analysis which may be utilized to identify a statistically significant signal. The analysis may be further adjusted to improve the accuracy in identifying actual targets, and to minimize the identification of invalid targets as actual targets.

Next, a step 425 is performed wherein the magnitude of the signal is compared to a threshold magnitude to determine if the digital signal is valid. This step may be performed as a simple comparison to a fixed threshold magnitude to identify a valid signal provided it was determined to be statistically significant in step 420 and of a magnitude greater than the fixed threshold value. Alternatively, the magnitude of statistically significant signals identified in step 420 corresponding to a particular target may be averaged over a number of sweeps, and the average compared to a threshold magnitude. Additionally, the threshold magnitude may be adapted to various values depending on the frequency of the received signal and/or based on the average magnitude of all received signals. For example, the average magnitude of all signals may be used to establish a background threshold, and a variable target threshold may thereafter be determined based on the background threshold plus a standard deviation.

Next a test 430 is performed wherein the system checks if there are valid targets in the demodulated data as identified in steps 420 and 425 above. If the results of the test 430 are negative, no valid targets are present, and the sub-routine returns to the step 405 wherein the standard duty cycle is set. If the results of the test 430 are positive, a valid target has been identified, and a step 432 is performed wherein the bearing of the target is computed and displayed. Thereafter, a step 435 is performed wherein the duty cycle of the antenna is adjusted.

The duty cycle of the antenna may be adjusted in a number of ways. First, the system determines the sector or sectors corresponding to the relative bearings of the valid targets. Next, the dwell time of those sectors is modified, e.g., increased. The dwell time may be increased a fixed amount, or the increase in dwell time may be determined corresponding to the magnitude of the target. Alternatively, the rotation control may be used to increase the overall time spent in a sector or group of sectors by reversing the direction of antenna rotation. After the duty cycle of the antenna is adjusted, the sub-routine returns to the steps 410 through 412 for another cycle of the antenna.

Figure 5A:
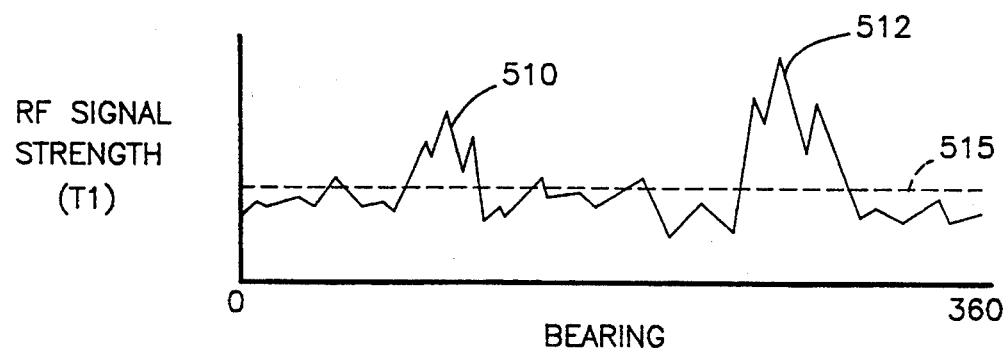
FIGS. 5a and 5b are graphs illustrating radio frequency signal strength received through an entire 360° sweep of the antenna at a first time (T1) and a subsequent sweep at a second time (T1+dT)
Figure 5B:
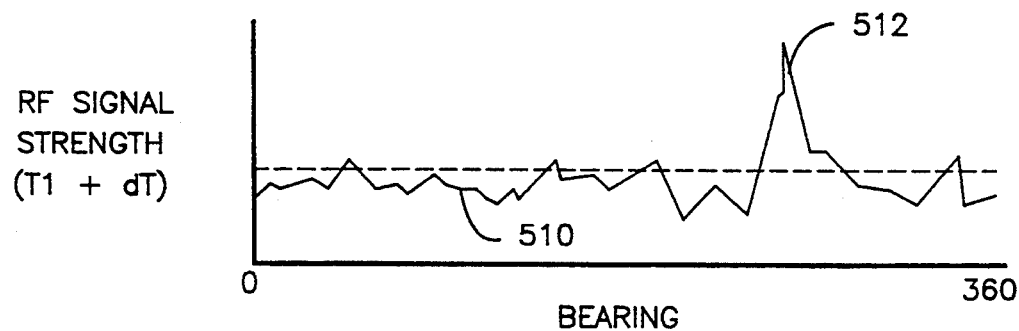
Figure 6:
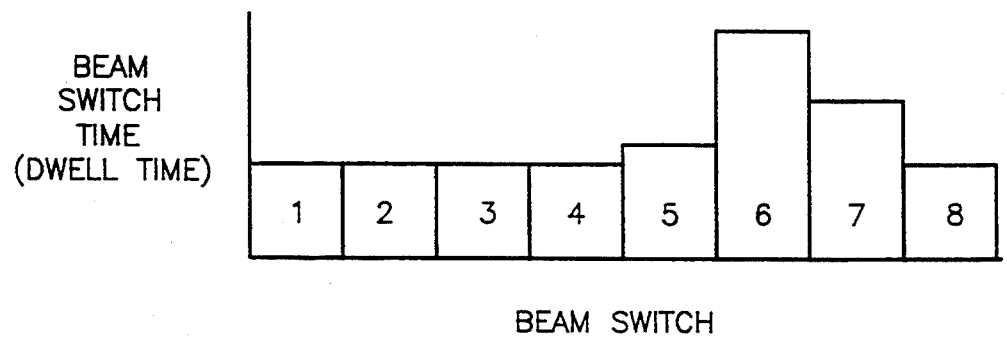
FIG. 6 is a graph illustrating the change in beam switch time (dwell time) provided by the system of FIG. 1 in response to receiving the signals illustrated in FIGS. 5a and 5b.

The operation of the system is best understood by example, referring to FIGS. 5a and 5b, shown are the magnitudes of received RF signals through an entire sweep of the antenna. In FIG. 5a, there are two targets 510 and 512 indicated above the threshold magnitude 515. In a subsequent sweep of the antenna as shown in FIG. 5b, only the target 512 remains above the threshold magnitude 515. The fact that target 510 has decreased below the threshold is indicative of a reflected or redirected signal. Assuming that the target 512 remains above the threshold magnitude for a sufficient number of sweeps of the antenna, a target will be identified by the statistical analysis function. Thereafter, the dwell time of the antenna is adjusted as indicated by FIG. 6. In FIG. 6, the antenna has eight sectors, and the bearing of the target 512 corresponds to sectors 5, 6 and 7. In FIG. 6, the dwell time is illustrated as being adjusted corresponding to the magnitude of the received RF signals. The remainder of the sectors which do not have valid targets remain at a constant dwell time. As described hereinabove, the dwell time of sectors corresponding to a target may be increased a fixed amount, or the dwell time may remain fixed and the direction of antenna rotation reversed around the sectors of interest to increase the percentage of time the antenna receives transmissions from the target.

The system has been described thus far as being used with an electronically scanned antenna. However, the system may also be used with a mechanically rotating antenna. In this configuration, the received RF signals are analyzed in the same manner as described hereinabove with respect to statistical analysis and signal strength validation. Thereafter, the mechanical rotation of the antenna is adjusted such that the antenna null spends a greater percentage of time pointed in the direction of valid targets during a complete rotation of the antenna. This may be accomplished by changing the speed of the mechanical rotation or by reversing the direction of antenna rotation to increase the overall percentage of time the null is directed toward the valid source of RF transmissions.

Although the invention has been described and illustrated with respect to exemplary embodiments thereof, it should be understood by those skilled in the art that the foregoing and various other changes, omissions and additions may be made therein and thereto without departing from the spirit and scope of the present invention.

I claim:

1. A radio direction finding system for determining the direction of radio frequency signal transmissions with respect to a receiving location, comprising:
   an antenna which performs 360° sweeps for receiving radio frequency signals from sources of radio frequency signal transmissions;
   receiver means coupled to said antenna and responsive to said received radio frequency signals for producing a plurality of output signals, each one of said plurality of output signals corresponding to said received radio frequency signals, said output signals containing information indicative of the signal strength and bearing of said received radio frequency signals;
   means responsive to said output signals for extracting said signal strength and bearing information and for providing corresponding signal strength signals and bearing signals indicative thereof;
   characterized by:
   means responsive to said signal strength signals and said bearing signals for determining if the magnitude of said signal strength signals are greater than a threshold magnitude, and for determining that a source of radio frequency signal transmissions is present at a bearing if signal strength signals of a magnitude greater than said threshold magnitude are present at a corresponding bearing for a statistically significant number of antenna sweeps.

2. A radio direction finding system according to claim 1 further comprising validation means responsive to said signal strength signals for validating that a source of radio frequency signal transmissions is present at a bearing if the magnitude of corresponding signal strength signals are greater than an adaptive threshold magnitude.

3. A radio direction finding system according to claim 1 further comprising means for controlling said antenna sweeps to increase the percentage of time said antenna is operated to receive radio frequency signals at bearings corresponding to said sources of radio frequency signal transmissions.

4. A radio direction finding system according to claim 1 further comprising:
   sensors for providing orientation signals indicative of the orientation of said antenna with respect to a fixed frame of reference; and
   means for correcting said bearing signals due to changes in antenna orientation with respect to said fixed frame of reference.

5. A radio direction finding system according to claim 1 wherein said antenna is an electronically scanned antenna.

6. A radio direction finding system according to claim 1 wherein said antenna is a mechanically rotating antenna.

7. A radio direction finding system according to claim 3 wherein said antenna is an electronically scanned antenna having a plurality of antenna sectors.

8. A radio direction finding system according to claim 7 wherein said percentage of time is increased by increasing the dwell time of antenna sectors corresponding to the bearings of said sources of radio frequency signal transmissions.

9. A radio direction finding system according to claim 7 wherein said percentage of time is increased by reversing the direction of antenna sector rotation.

10. A radio direction finding system according to claim 3 wherein said antenna is a mechanically rotating antenna.

11. A radio direction finding system according to claim 10 wherein said percentage of time is increased by changing the rate of antenna rotation.

12. A radio direction finding system according to claim 10 wherein said percentage of time is increased by reversing the direction of antenna rotation.

13. A radio direction finding system according to claim 2 further comprising means for controlling said antenna sweep to increase the percentage of time said antenna is operated to receive radio frequency signals at bearings corresponding to said sources of radio frequency signal transmissions.

14. A radio direction finding system according to claim 13 further comprising:
sensors for providing orientation signals indicative of the orientation of said antenna with respect to a fixed frame of reference; and
means for correcting said bearing signals due to changes in antenna orientation with respect to said fixed frame of reference.

15. A radio direction finding system according to claim 2 wherein said antenna is an electronically scanned antenna.

16. A radio direction finding system according to claim 2 wherein said antenna is a mechanically rotating antenna.

17. A radio direction finding system according to claim 13 wherein said antenna is an electronically scanned antenna having a plurality of antenna sectors.

18. A radio direction finding system according to claim 17 wherein said percentage of time is increased by increasing the dwell time of antenna sectors corresponding to the bearings of said sources of radio frequency signal transmissions.

19. A radio direction finding system according to claim 17 wherein said percentage of time is increased by reversing the direction of antenna sector rotation.

20. A radio direction finding system according to claim 13 wherein said antenna is a mechanically rotating antenna.

21. A radio direction finding system according to claim 20 wherein said percentage of time is increased by changing the rate of antenna rotation.

22. A radio direction finding system according to claim 20 wherein said percentage of time is increased by reversing the direction of antenna rotation.

23. A radio direction finding system according to claim 2 wherein said adaptive threshold magnitude is equal to the average magnitude of all of said signal strength signals plus a standard deviation.

24. A method for determining the direction of radio frequency signal transmissions with respect to a receiving location, comprising the steps of:
performing 360° sweeps with an antenna for receiving radio frequency signals from sources of radio frequency signal transmissions;
providing output signals corresponding to radio frequency signals received during said 360° sweeps, said output signals containing information indicative of the signal strength and bearing of said received radio frequency signals;
extracting said signal strength and bearing information from said output signals and providing corresponding signals strength signals and bearing signals indicative thereof;
determining if the magnitude of said signal strength signals are greater than a threshold magnitude; and
identifying a source of radio frequency signal transmissions at a bearing if signal strength signals of a magnitude greater than a threshold magnitude are present at a corresponding bearing for a statistically significant number of antenna sweeps.

25. The method of claim 24 further comprising the step of validating that a source of radio frequency signal transmissions is present at a bearing if the magnitude of corresponding signal strength signals are greater than an adaptive threshold magnitude.

26. The method of claim 25 wherein said adaptive threshold magnitude is equal to the average magnitude of all of said signal strength signals plus a standard deviation.

27. The method of claim 24 further comprising the step of controlling said antenna sweeps to increase the percentage of time said antenna is operated to receive radio frequency signals at bearings corresponding to said sources of radio frequency signal transmissions.

28. The method of claim 24 further comprising the steps of:
sensing the orientation of said antenna with respect to a fixed frame of reference; and
correcting said bearing signals due to changes in antenna orientation with respect to said fixed frame of reference.

29. The method of claim 25 further comprising the step of controlling said antenna sweeps to increase the percentage of time said antenna is operated to receive radio frequency signals at bearings corresponding to said sources of radio frequency signal transmissions.

30. The method of claim 25 further comprising the steps of:
sensing the orientation of said antenna with respect to a fixed frame of reference; and
correcting said bearing signals due to changes in antenna orientation with respect to said fixed frame of reference.

31. The method of claim 29 further comprising the steps of:
sensing the orientation of said antenna with respect to a fixed frame of reference; and
correcting said bearing signals due to changes in antenna orientation with respect to said fixed frame of reference.

* * * * *